US011685440B2

(12) United States Patent
Varunjikar et al.

(10) Patent No.: US 11,685,440 B2
(45) Date of Patent: Jun. 27, 2023

(54) SYSTEM AND METHOD FOR SHARED CONTROL FOR EMERGENCY STEERING (71) Applicant: STEERING SOLUTIONS IP HOLDING CORPORATION, Saginaw, MI (US)

(72) Inventors: Tejas M. Varunjikar, Troy, MI (US); Mariam S. George, Lake Orion, MI (US); Zaki Ryne, Rochester Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 138 days.

(21) Appl. No.: 17/034,362

(22) Filed: Sep. 28, 2020

(65) Prior Publication Data

US 2021/0107567 A1 Apr. 15, 2021

Related U.S. Application Data (60) Provisional application No. 62/913,379, filed on Oct. 10, 2019.

(51) Int. Cl.
*B62D 15/02* (2006.01)
*G01S 13/931* (2020.01)
*G01S 15/931* (2020.01)
*G01S 17/931* (2020.01)

(52) U.S. Cl.
CPC ........ *B62D 15/0265* (2013.01); *G01S 13/931* (2013.01); *G01S 15/931* (2013.01); *G01S 17/931* (2020.01); *B62D 15/021* (2013.01)

(58) Field of Classification Search
CPC . B62D 15/0265; B62D 15/021; G01S 17/931; G01S 13/931; G01S 15/931
See application file for complete search history.

(56) References Cited

U.S. PATENT DOCUMENTS

| 6,625,530 B1 | 9/2003 | Bolourchi |
| 6,687,588 B2 | 2/2004 | Demerly et al. |
| 2004/0193374 A1* | 9/2004 | Hac ........................ G08G 1/166 701/301 |

(Continued)

FOREIGN PATENT DOCUMENTS

CN 105612091 B * 8/2018 ............... B60T 7/12

*Primary Examiner* — Peter D Nolan
*Assistant Examiner* — Demetra R Smith-Stewart
(74) *Attorney, Agent, or Firm* — Dickinson Wright PLLC (57) ABSTRACT An emergency steering system for a vehicle includes a memory including instructions that, when executed by a processor, cause the processor to: receive information corresponding to an environment external to the vehicle; identify an obstacle in the environment external to the vehicle using the information; determine a distance between the vehicle and the obstacle; determine whether a collision is imminent; in response to determining that a collision is imminent, determine whether the vehicle can move within a lane of travel to avoid the collision; in response to determining that the vehicle can move within the lane of travel to avoid the collision, determine a trajectory of travel for the vehicle; generate a steering assist angle command based on the trajectory of travel; and control position of a steering mechanism of the vehicle using the steering assist angle command and a measured steering angle.

20 Claims, 7 Drawing Sheets (56) References Cited

U.S. PATENT DOCUMENTS

| | | | |
|---|---|---|---|
| 2014/0067252 A1* | 3/2014 | Knoop | B60W 10/20 |
| | | | 701/400 |
| 2016/0001781 A1* | 1/2016 | Fung | G16H 50/20 |
| | | | 701/36 |
| 2016/0200360 A1* | 7/2016 | Moshchuk | B62D 6/002 |
| | | | 701/41 |
| 2016/0280265 A1* | 9/2016 | Hass | B62D 15/0265 |
| 2017/0297618 A1 | 10/2017 | Shah et al. | |
| 2018/0001927 A1* | 1/2018 | Howing | B62D 6/10 |
| 2018/0281844 A1* | 10/2018 | Wijffels | B62D 6/002 |
| 2018/0281845 A1* | 10/2018 | Wijffels | B62D 5/0457 |
| 2020/0031335 A1* | 1/2020 | Ohmura | B60W 50/082 |
| 2020/0156639 A1* | 5/2020 | Liu | G05D 1/0088 |

* cited by examiner

SYSTEM AND METHOD FOR SHARED CONTROL FOR EMERGENCY STEERING

CROSS-REFERENCES TO RELATED APPLICATIONS

This patent application claims priority to U.S. Provisional Patent Application Ser. No. 62/913,379, filed Oct. 10, 2019, which is incorporated herein by reference in its entirety.

TECHNICAL FIELD

This disclosure relates to vehicles steering and in particular to systems and methods for shared control for emergency steering for vehicles.

BACKGROUND OF THE INVENTION

Vehicles, such as cars, trucks, sport utility vehicles, crossovers, mini-vans, or other suitable vehicles, are increasingly including occupant safety features. Advances in such occupant safety features has significantly reduced the number of fatalities and injuries resulting from vehicle collisions (e.g., with other vehicles or other objects). Typical occupant safety features include passive safety features and active safety features. Passive safety features may include seat belts, airbags, improved chassis structure design, and the like. Active safety features may include electronic stability control (ESC), anti-lock braking system (ABS), adaptive cruise control (ACC), automatic braking system, lane assist systems, and the like.

SUMMARY OF THE INVENTION

This disclosure relates generally to emergency steering systems and methods for vehicles.

An aspect of the disclosed embodiments includes an emergency steering system for a vehicle. The system includes a processor and a memory. The memory includes instructions that, when executed by the processor, cause the processor to: receive, from at least one input sensor, information corresponding to an environment external to the vehicle; identify at least one obstacle in the environment external to the vehicle using the information; determine a distance between the vehicle and the at least one obstacle; determine whether a collision between the vehicle and the at least one obstacle is imminent based on the distance between the vehicle and the at least one obstacle and a vehicle speed; in response to determining that a collision between the vehicle and the at least one obstacle is imminent, determine whether the vehicle can move within a lane of travel to avoid the collision; in response to determining that the vehicle can move within the lane of travel to avoid the collision, determine a trajectory of travel for the vehicle; generate a steering assist angle command based on the trajectory of travel; and control position of a steering mechanism of the vehicle using the steering assist angle command and a measured steering angle.

Another aspect of the disclosed embodiments includes a system for controlling steering of a vehicle. The system includes a processor and a memory. The memory includes instructions that, when executed by the processor, cause the processor to: receive, from at least one sensor, information corresponding to an environment external to the vehicle; identify at least one obstacle in the environment external to the vehicle using the information; determine a distance between the vehicle and the at least one obstacle; determine whether a collision between the vehicle and the at least one obstacle is imminent based on the distance between the vehicle and the at least one obstacle and a vehicle speed; in response to a determination that a collision between the vehicle and the at least one obstacle is imminent, determine whether the vehicle can move within a lane of travel to avoid the collision; in response to a determination that the vehicle can move within the lane of travel to avoid the collision, determine a trajectory of travel for the vehicle; generate a steering assist angle command based on the trajectory of travel; and control position of a steering mechanism of the vehicle using the steering assist angle command and a measured steering angle.

Another aspect of the disclosed embodiments includes a method for controlling steering of a vehicle. The method includes receiving, from at least one sensor, information corresponding to an environment external to the vehicle and identifying at least one obstacle in the environment external to the vehicle using the information. The method also includes determining a distance between the vehicle and the at least one obstacle and determining whether a collision between the vehicle and the at least one obstacle is imminent based on the distance between the vehicle and the at least one obstacle and a vehicle speed. The method also includes, in response to a determination that a collision between the vehicle and the at least one obstacle is imminent, determining whether the vehicle can move within a lane of travel to avoid the collision. The method also includes, in response to a determination that the vehicle can move within the lane of travel to avoid the collision, determining a trajectory of travel for the vehicle. The method also includes generating a steering assist angle command based on the trajectory of travel and controlling position of a steering mechanism of the vehicle using the steering assist angle command and a measured steering angle.

Another aspect of the disclosed embodiments includes an apparatus for controlling steering of a vehicle. The apparatus includes a processor and a memory. The memory includes instructions that, when executed by the processor, cause the processor to: determine a distance between the vehicle and at least one obstacle, the at least one obstacle being indicated by an output of at least one sensor; determine whether a collision between the vehicle and the at least one obstacle is imminent based on the distance between the vehicle and the at least one obstacle and a vehicle speed; in response to a determination that a collision between the vehicle and the at least one obstacle is imminent, determine a trajectory of travel for the vehicle that avoids collision with the obstacle while maintaining a lane of travel of the vehicle; generate a steering assist angle command based on the trajectory of travel; and control position of a steering mechanism of the vehicle using the steering assist angle command and a measured steering angle.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, or other suitable vehicles, are increasingly including occupant safety features. Advances in such occupant safety features has significantly reduced the number of fatalities and injuries resulting from vehicle collisions (e.g., with other vehicles or other objects). Typical occupant safety features include passive safety features and active safety features. Passive safety features may include seat belts, airbags, improved chassis structure design, and the like. Active safety features may include electronic stability control (ESC), anti-lock braking system (ABS), adaptive cruise control (ACC), automatic braking system, lane assist systems, and the like.

Active safety features may be crucial in avoiding a collision between vehicles or between a vehicle and an obstacle in the path of the vehicle. In addition, active safety features may contribute to the mitigation of the severity of a collision. Recently, the National Highway Traffic Safety Administration (NHTSA) has reported that at least 10 auto manufacturers had committed to making automatic braking features a standard feature on all new vehicles. Automatic braking systems may significantly reduce the likelihood and/or severity of rear-end collisions.

Additionally, a vehicle steering system, such as an electronic power steering system (EPS), a steer-by-wire system (SbW), or other suitable steering system may provide active safety features (e.g., similar to automatic braking systems) by assisting an operator of the vehicle avoid a collision or mitigate the severity of a collision. For example, it may be possible to avoid a rear-end collision if the operator reacts relatively early and effectively by applying brakes, steering, or a combination thereof.

Typical vehicles include lane assistance features that use image data captured by an image capturing device (e.g., a camera or other suitable image capturing device) or using other sensor data (e.g. radar sensor information or other suitable sensor information). Typical lane assist features include lane keep features, lane centering features, and the like. Such typical vehicles, however, do not include steering systems that use image data and/or other sensor data to perform automated emergency steering to avoid a collision or to mitigate the severity of the collision.

Automated vehicle lane change for obstacle or collision avoidance has been researched for more than a decade in academia and industry. However, most of the research focuses only vehicle level control in a lane change event. Additionally, such research is generally focused on autonomous driving (e.g., no operator in the loop) scenarios.

Accordingly, systems and methods, such as those described herein, that are configured to avoid a collision or to mitigate the severity of the collision, using an automated emergency steering system, in operator-in-loop scenarios (e.g., hands-on scenarios where steering control is shared between an operator and an advanced driver-assistance system (ADAS) module, may be desirable. In some embodiments, the systems and methods described herein may be configured to provide automated emergency steering to avoid a collision or to mitigate the severity of the collision while keeping the vehicle in a lane of travel of the vehicle. This may be a relatively more feasible manner of collision avoidance than completely changing the lane of travel of the vehicle. In some embodiments, the systems and methods described herein may be configured to assist the operator of the vehicle steer the vehicle within the lane of travel to reduce the severity of the collision and to avoid other collisions associated with changing the lane of travel in an emergency fashion.

In some embodiments, the systems and methods described herein may use a camera or a camera and a front radar sensor for detecting an obstacle ahead of the vehicle. If the obstacle (car, pedestrian etc.) is situated such that vehicle can move within a lane or a reasonable lower lateral distance, the systems and methods described herein may be configured to take a steering action to assist a driver to follow an avoidance path/trajectory.

In some embodiments, the systems and methods described herein may be configured to receive, from at least one input sensor, information corresponding to an environment external to the vehicle. The systems and methods described herein may be configured to identify at least one obstacle in the environment external to the vehicle using the information and determine a distance between the vehicle and the at least one obstacle. The systems and methods described herein may be configured to determine whether a collision between the vehicle and the at least one obstacle is imminent based on the distance between the vehicle and the at least one obstacle and a vehicle speed. The systems and methods described herein may be configured to, in response to determining that a collision between the vehicle and the at least one obstacle is imminent; determine whether the vehicle can move within a lane of travel to avoid the collision. The systems and methods described herein may be configured to, in response to determining that the vehicle can move within the lane of travel to avoid the collision, determine a trajectory of travel for the vehicle. The systems and methods described herein may be configured to generate a steering assist angle command based on the trajectory of travel and control position of a steering mechanism of the vehicle using the steering assist angle command and a measured steering angle.

Figure 1:
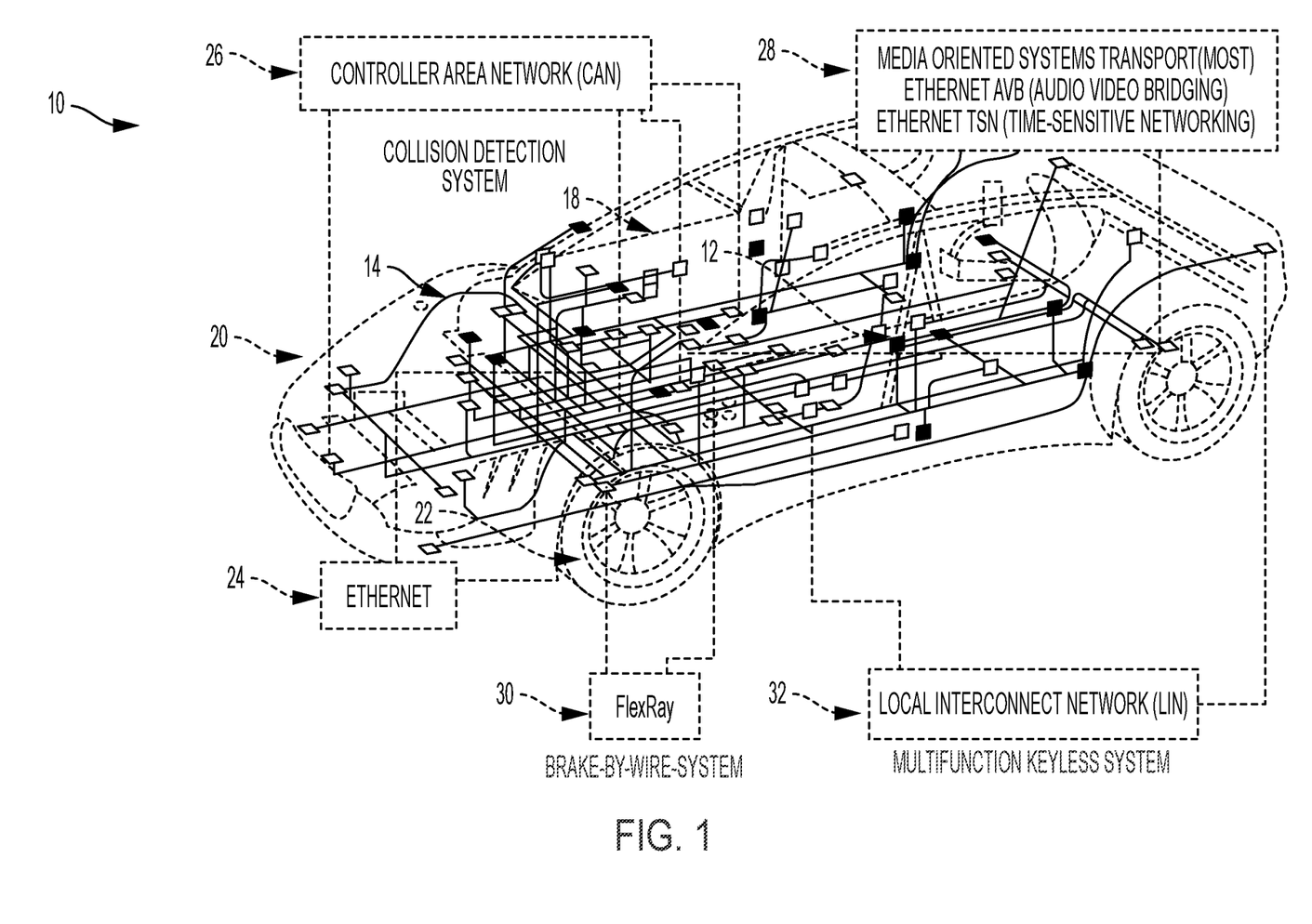
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system or other suitable steering system. The steering system may be configured to receive various inputs, including, but not limited to, a handwheel position, an input torque, one or more roadwheel positions, other suitable inputs or information, or a combination thereof. The steering system may be configured to provide steering function and/or control to the vehicle 10. For example, the steering system may generate an assist torque based on the various inputs. The steering system may be configured to selectively control a motor (e.g., an EPS motor) of the steering system by applying a torque overlay (e.g. the assist torque) to the motor to provide steering assist to the operator of the vehicle 10.

Figure 2:
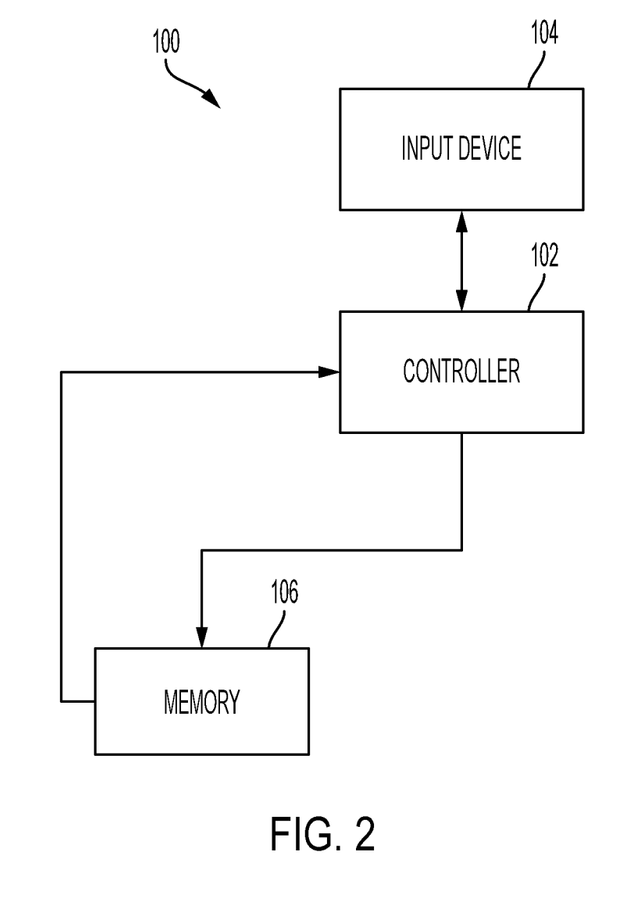
FIG. 2 generally illustrates an automated emergency steering system according to the principles of the present disclosure.

The vehicle 10 may include an automated emergency steering (AES) system 100 as is generally illustrated in FIG. 2. The AES system 100 may be referred to as an emergency steering assist (ESA) system. The system 100 may be configured to provide AES assistance to an operator of the vehicle 10 in order to avoid a collision between the vehicle 10 and an obstacle in a path being traversed by the vehicle 10 (e.g., a path of travel of the vehicle 10). The system 100 may include a controller 102, an input device 104, and a memory 106. The controller 102 may include any suitable controller, such as a vehicle electronic control unit, or other suitable controller. The controller 102 may include a processor and a memory, such as the memory 106.

The processor may include any suitable processor, such as those described herein. Additionally, or alternatively, the controller 102 may include any suitable number of processors. The memory 106 may comprise a single disk or a plurality of disks (e.g., hard drives), and includes a storage management module that manages one or more partitions within the memory 106. In some embodiments, memory 106 may include flash memory, semiconductor (solid state) memory or the like. The memory 106 may include Random Access Memory (RAM), a Read-Only Memory (ROM), or a combination thereof.

The memory 106 may include instructions that, when executed by the processor, cause the processor to, at least, control various functions or operations of the vehicle 10. The memory 106 may include any suitable non-volatile or volatile memory. The memory 106 may include a memory array, a memory storage device, or any other suitable memory. The memory 106 may include instructions that, when executed by the processor of the controller 102, cause the processor to perform an AES process or method.

The controller 102 may be configured to receive input from the input device 104. The input device 104 may include any suitable input device or a plurality of suitable input devices. For example, the input device 104 may include an image-capturing device (e.g., a camera or other suitable image-capturing device), a radio detection and ranging (radar) sensor, a light detection and ranging (LIDAR) sensor, a global positioning system (GPS) sensor, a sound navigation and ranging (sonar) sensor, other suitable sensors, or a combination thereof. The input device 104 is configured to generate the input and communicate the input to the controller 102. The input may include image data corresponding to an environment external to the vehicle 10 within a field of vision of the input device 104 and/or various other data, such as radar data, LIDAR data, sonar data, GPS data, other suitable data, or a combination of image data and the various other data.

Figure 3:
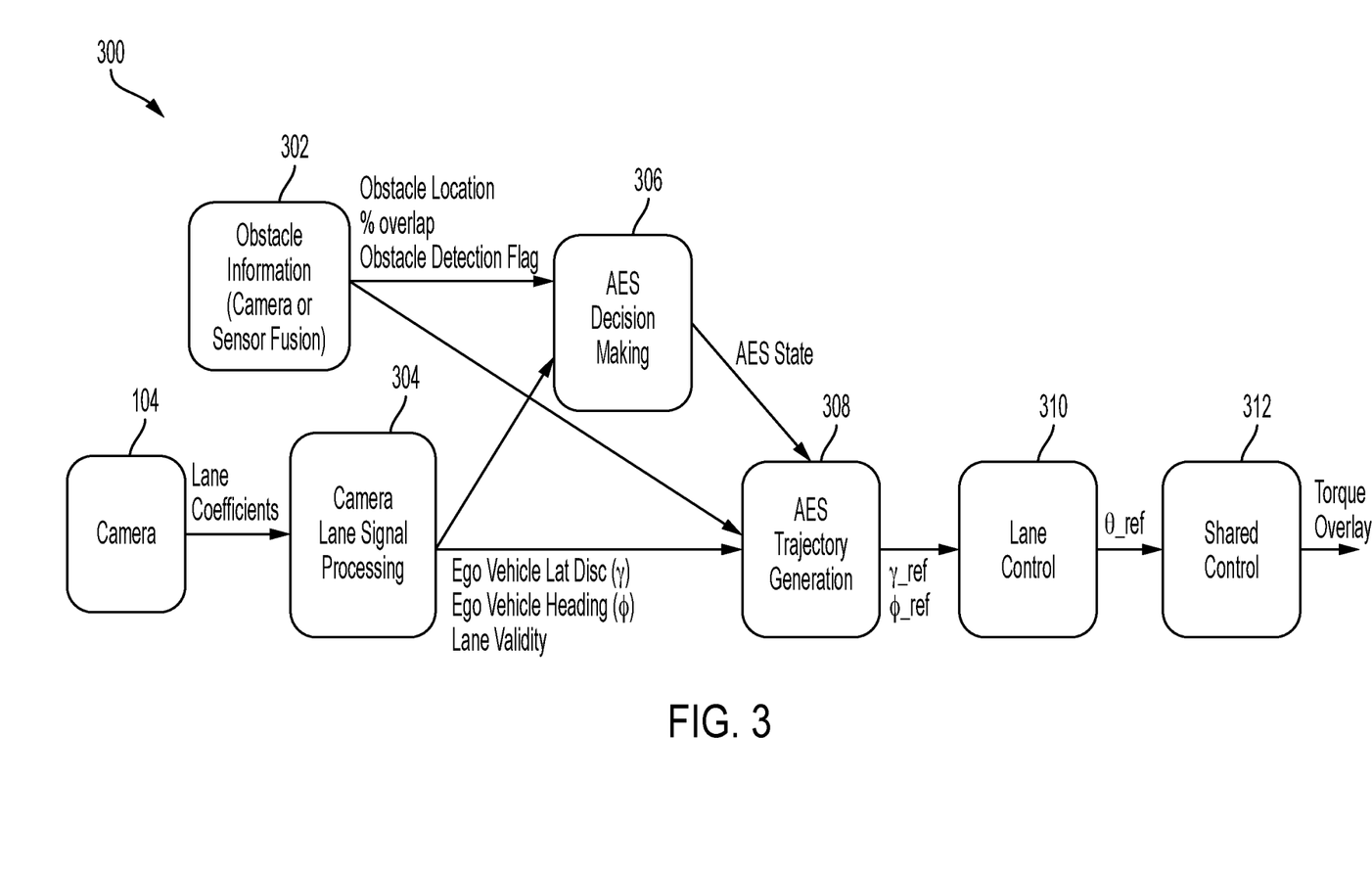
FIG. 3 generally illustrates an automated emergency steering architecture according to the principles of the present disclosure.

FIG. 3 generally illustrates an AES architecture 300 according to the principles of the present disclosure. The architecture 300 includes obstacle information 302. The obstacle information 302 may be generated by the controller 102 based on image data and/or other various data received from the input device 104. The controller 102 may analyze the image data and/or other various data and identify obstacles in the path being traversed by the vehicle 10. In some embodiments, the controller 102 may use artificial intelligence such as machine learning, a neural network (e.g., a convolutional neural network or other suitable neural network), and the like to identify obstacle using the image data and/or other various data.

The controller 102 may identify a first obstacle at least partially in the path being traversed by the vehicle 10. The controller 102 may determine a location of the first obstacle using the image data and/or other various data relative to the vehicle or an absolute location of the obstacle. The controller 102 may determine a percentage of overlap between the obstacle and the portion of the path being traversed by the vehicle 10. The controller 102 may set an obstacle detection flag in response to identifying the first obstacle. In some embodiments, the controller 102 sets the obstacle detection flag based on a determination that the percentage of overlap is above a threshold.

In some embodiments, the controller 102 may identify lane information using image data from the input device 104. For example, as described, the input device 104 may include an image-capturing device that captures images within a field of vision of the image-capturing device. The field of vision may include a portion of the environment external to the vehicle 10 that is within the travel path of the vehicle 10. The controller 102 may analyze the image data, as described, and may generate lane coefficients corresponding to lane indicators of the lane of travel of the vehicle 10. For example, the architecture 300 may include camera lane signal processing 304. The controller 102 may process the camera lane signals (e.g., the image data and/or the lane coefficients) to generate lane information. The lane information may include a vehicle lateral distance of the vehicle 10, a vehicle heading of the vehicle 10, a lane validity, other suitable information, or a combination thereof.

Figure 4:
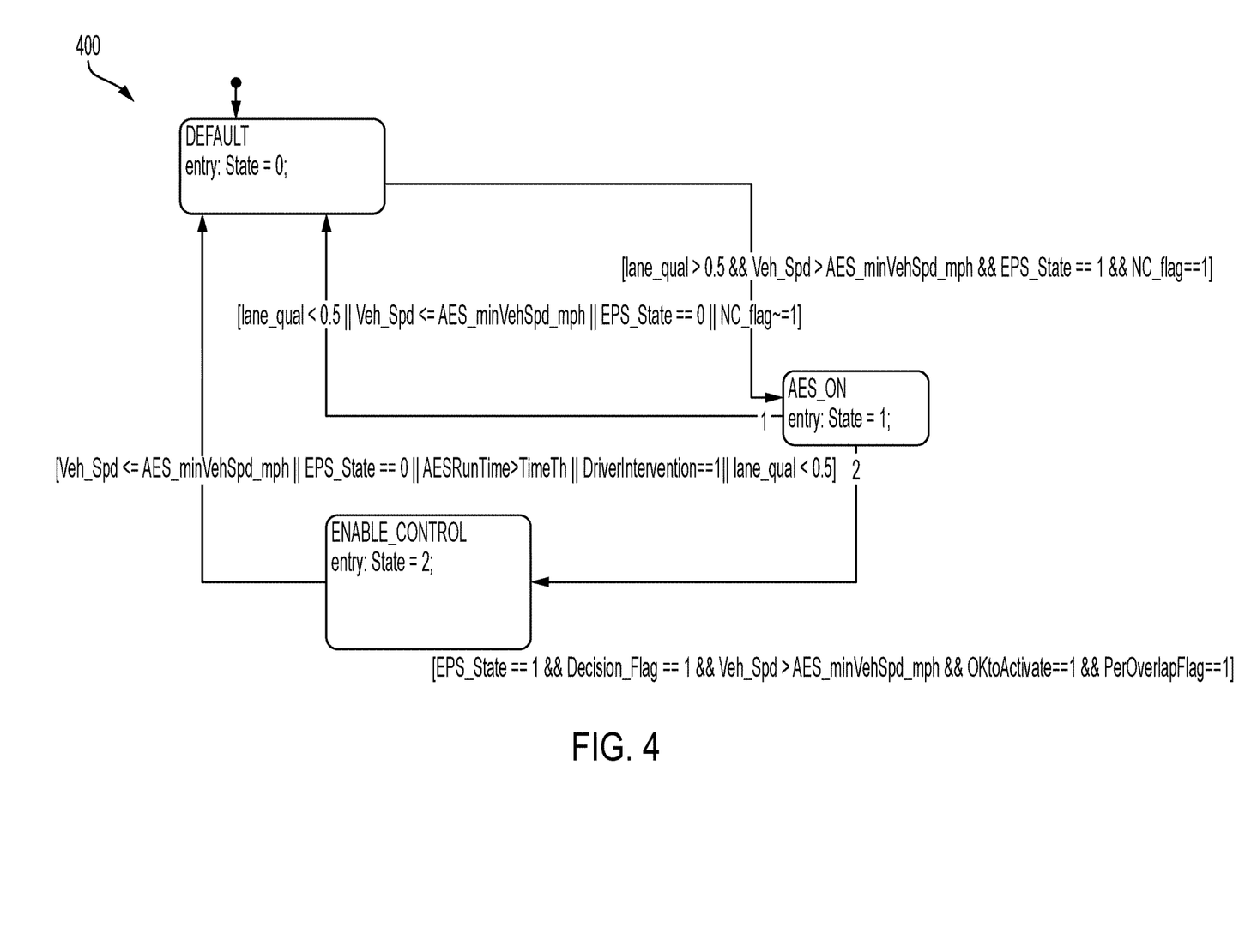
FIG. 4 generally illustrates an automated emergency steering decision-making diagram according to the principles of the present disclosure.

In some embodiments, the controller 102 may determine whether to provide emergency steering assistance to the operator of the vehicle 10 based on the obstacle detection flag, the lane information, other suitable data, or a combination thereof. For example, the architecture 300 may include AES decision-making 306. The controller 102 may determine whether a collision between the vehicle 10 and the first obstacle is imminent. The controller 102 may determine a distance between the vehicle 10 and the first obstacle using the image data and/or other various data received from the input device 104. FIG. 4 generally illustrates an automated emergency steering decision-making diagram 400 according to the principles of the present disclosure. The diagram 400 illustrates the AES decision making 306 which, in some embodiments, checks for various criteria to decide if AES feature should be ON, (e.g., state 1). If the first obstacle is detected (e.g., Decision Flag is true), transition to next state, (e.g., state 2), where active steering is applied. The Decision Flag checks if a collision is imminent and operating conditions are favorable (e.g., vehicle speed, lane info etc.).

If the controller 102 determines that the distance is within a predetermined distance from (e.g., a critical distance), then the controller 102 determines a current vehicle speed. Conversely, if the controller 102 determines that the distance is not within the predetermined distance, the controller 102 continues to monitor the positon of the first obstacle and the distance between the vehicle 10 and the first obstacle. In some embodiments, the predetermined distance may be based on the current vehicle speed and longitudinal braking capacity (e.g., the predetermined distance may vary based on speed and braking capacity). For example, the predetermined distance may be based on vehicle speed (U) and longitudinal braking capability (ax) (e.g., critical distance=U2/ax). In some embodiments, some additional threshold may be added to the above formula to account for operator reaction time.

If the controller 102 determines that the current vehicle speed is above a threshold, the controller 102 determines whether the vehicle 10 can move within the lane of travel to avoid the collision or mitigate the severity of the collision. The threshold may include a threshold speed that is determined based on the distance between the vehicle 10 and the first obstacle (e.g., the threshold may be lower when the distance is relatively small and higher when the distance is relatively large). If the controller 102 determines that the current vehicle speed is not above the threshold, the controller 102 continues to monitor the positon of the first obstacle and the vehicle speed.

If the controller 102 determines that, the vehicle 10 cannot move within the lane of travel to avoid the collision or mitigate the severity of the collision, the controller 102 initiates collision avoidance alternative. For example, the controller 102 may initiate a lane change procedure, a braking procedure, other suitable procedure, or a combination thereof. Conversely, if the controller 102 determines that the vehicle 10 can move within the lane of travel to avoid the collision or to mitigate the severity of the collision, the controller 102 determines a trajectory for the vehicle 10. For example, the architecture 300 includes AES trajectory generation 308. The trajectory generation includes generating a smooth curve to transition laterally from given location of the vehicle 10 to a target location. The target location is determined, by the controller 102, such that vehicle 10 stays within the lane of travel, but laterally moves as far from first obstacle as possible. The controller 102 generates a lateral position reference (y_ref) and heading angle reference (F_ref) value at given time.

Figure 5:
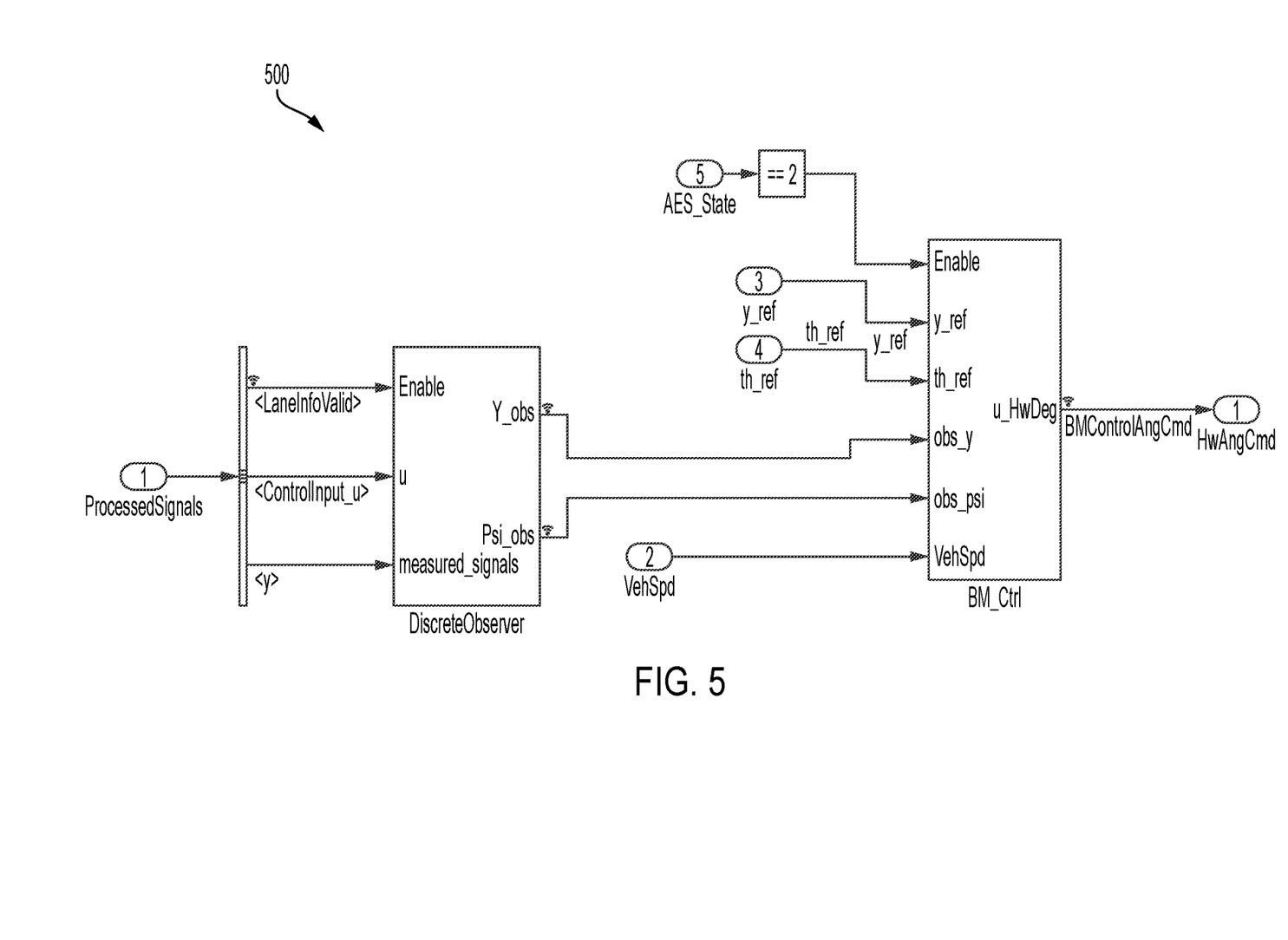
FIG. 5 generally illustrates a lane control diagram according to the principles of the present disclosure.

The architecture 300 includes lane control 310. For example, the controller 102 uses an observer to get a lateral position and heading of the vehicle 10 in a pseudo-global reference frame. The pseudo-global reference frame assumes lane center to be zero lateral position. The reference commands from AES trajectory generation 308 are used by the controller 102 (e.g., lane control 310) to generate an angle command.

$$\theta_{ref} = K1*(y_{ref} - obs_y) + K2*(th_{ref} - obs_{psi})*U$$

Where K1, K2 are gains dependent on the speed of the vehicle 10. FIG. 5 generally illustrates a lane control diagram 500 according to the principles of the present disclosure.

The architecture 300 includes shared control 312. For example, the controller 102 generates the angle command (e.g., at lane control 310) and uses the angle command and a measured steering angle to perform position control. The controller 102 may perform position control in any suitable manner, such as using various strategies, such as PI, PID, or other suitable feedforward or feedback control techniques. The controller 102 generates a torque overlay that is provided to a steering assist mechanism. The controller 102 controls position of a steering mechanism by applying the torque overlay to the steering assist mechanism. The steering assist mechanism may be able suitable steering assist mechanism that provides steering assistance to the operator of the vehicle 10 that is added to steering assist. Additionally, or alternative, the controller 102 may monitor an operator applied torque signal (e.g., a signal from a torque sensor that monitors applied torque on the steering mechanism). If the operator applied torque signal is above a threshold (e.g., the operator is resisting the emergency steering assistance), the controller 102 deactivates the AES (e.g., by deactivating the position control of the steering mechanism).

Figure 6:
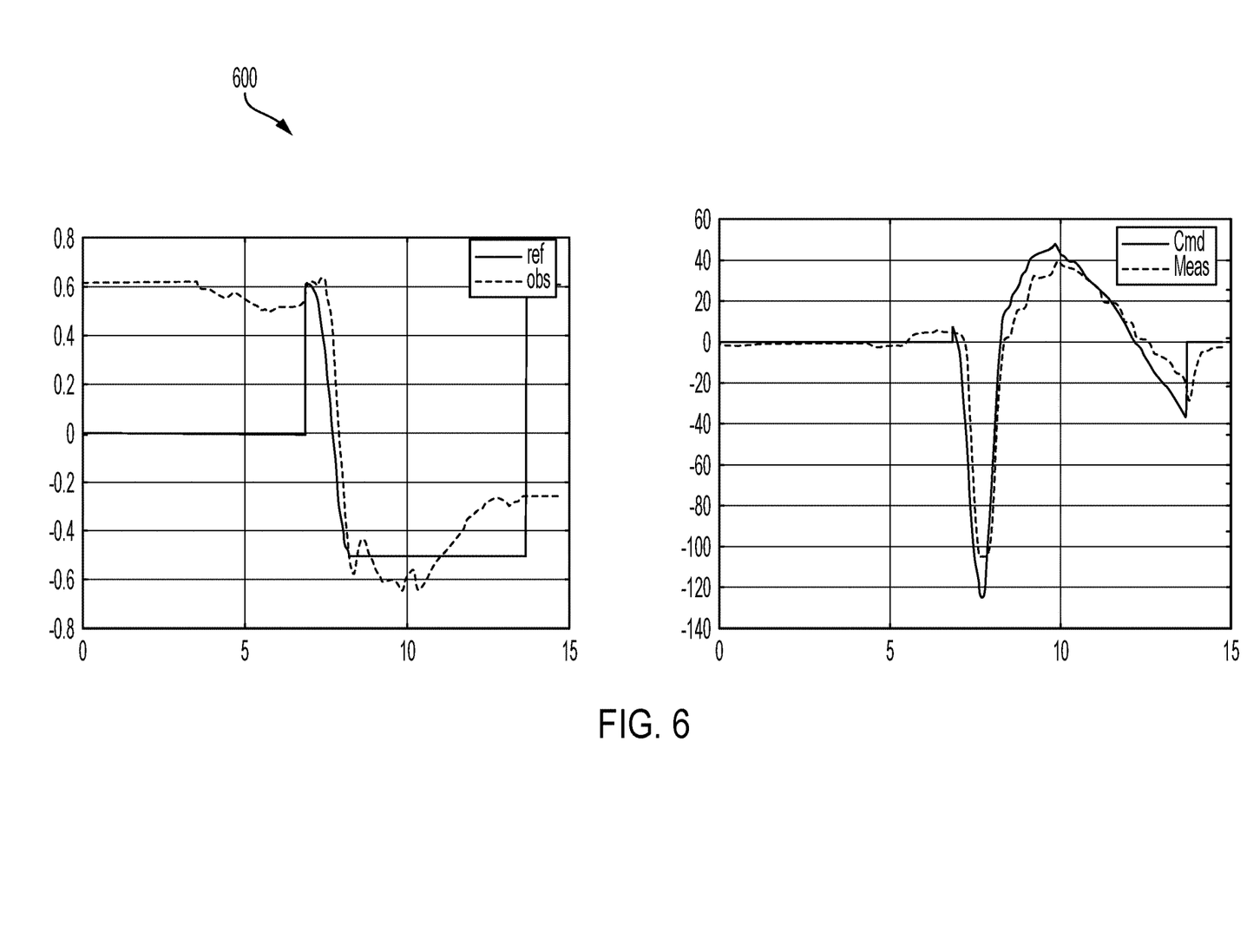
FIG. 6 generally illustrates an automated emergency steering function chart according to the principles of the present disclosure.

FIG. 6 generally illustrates an automated emergency steering function chart 600 according to the principles of the present disclosure. The chart 600 illustrates an example where the controller 102 (e.g., providing the AES function) generated a reference trajectory at 6.8 seconds and the operator of the vehicle 10 followed the generated steering angle due to torque overlay with light grip.

In some embodiments, the system 100 may perform the methods described herein. However, the methods described herein as performed by system 100 are not meant to be limiting, and any type of software executed on a controller can perform the methods described herein without departing from the scope of this disclosure. For example, a controller, such as a processor executing software within a computing device, can perform the methods described herein.

Figure 7:
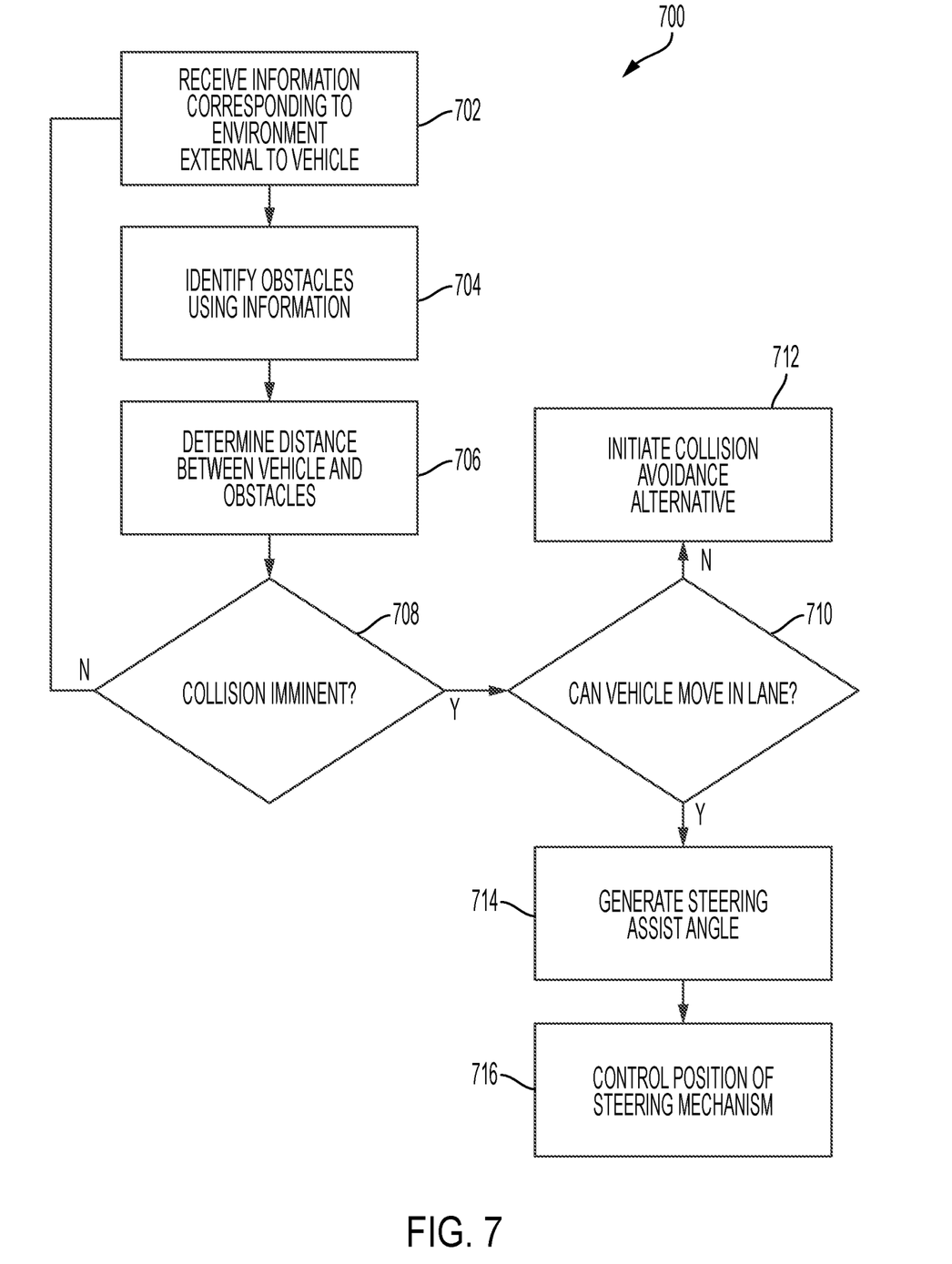
FIG. 7 is a flow diagram generally illustrating an automated emergency steering method according to the principles of the present disclosure.

FIG. 7 generally illustrates an automated emergency steering method 700 according to the principles of the present disclosure. At 702, the method 700 revives information corresponding to an environment external to the vehicle. For example, the controller 102 receives the image data and/or various other data from the input device 104.

At 704, the method 700 identifies obstacles using the information. For example, the controller 102 may identify the first obstacle using the image data and/or the various other data.

At 706, the method 700 determines a distance between the vehicle and the obstacles. For example, the controller 102 determines a distance between the vehicle 10 and the first obstacle.

At 708, the method 700 determines whether a collision is imminent. For example, the controller 102 determines whether a collision between the vehicle 10 and the first obstacle is imminent based on the distance between the vehicle 10 and the first obstacle being within the predetermined distance and/or the vehicle speed and the braking capacity of the vehicle 10. If the controller 102 determines that a collision is not imminent, the method continues at 702. If the controller 102 determines that a collision is imminent, the method continues at 710.

At 710, the method 700 determines whether the vehicle can move in the lane of travel of the vehicle. For example, the controller 102 determines whether the vehicle 10 can move within the lane of travel of the vehicle 10 to avoid the collision or mitigate the severity of the collision. If the controller 102 determines that the vehicle 10 cannot move within the lane of travel to avoid the collision or to mitigate the severity of the collision, the method continues at 712.

At 712, the method 700 initiates a collision avoidance alternative. For example, the controller 102 initiates a collision avoidance alternative, such as those described, in order to avoid the collision or mitigate the severity of the collision. If, at 710, the controller 102 determines that the vehicle 10 may move within the lane of travel to avoid the collision or to mitigate the severity of the collision, the method continues at 714.

At 714, the method 700 generates a steering assist angle. For example, the controller 102 generates a trajectory for the vehicle 10 to avoid the collision or mitigate the severity of the collision by moving within the lane of travel (e.g., not leaving the lane of travel). The controller 102 generates a steering assist angle (e.g., the angle command) based on the trajectory.

At 716, the method 700 controls position of a steering mechanism. For example, the controller 102 controls the positon of the steering mechanism based on the steering assist angle and a measured position of the steering mechanism. As described, the controller 102 may monitor a torque signal associated with the steering mechanism and may deactivate AES functions in response to the torque signal being above a threshold (e.g., if the operator of the vehicle 10 resists the AES function). For example, the controller 102 may be configured to determine whether the torque signal indicates that the operator is resisting the steering maneuver. In response to a determination that the torque signal indicates that the operating is resisting the steering maneuver, the controller 102 may deactivate the AES function.

In some embodiments, an emergency steering system for a vehicle includes a processor and a memory. The memory includes instructions that, when executed by the processor, cause the processor to: receive, from at least one input sensor, information corresponding to an environment external to the vehicle; identify at least one obstacle in the environment external to the vehicle using the information; determine a distance between the vehicle and the at least one obstacle; determine whether a collision between the vehicle and the at least one obstacle is imminent based on the distance between the vehicle and the at least one obstacle and a vehicle speed; in response to determining that a collision between the vehicle and the at least one obstacle is imminent, determine whether the vehicle can move within a lane of travel to avoid the collision; in response to determining that the vehicle can move within the lane of travel to avoid the collision, determine a trajectory of travel for the vehicle; generate a steering assist angle command based on the trajectory of travel; and control position of a steering mechanism of the vehicle using the steering assist angle command and a measured steering angle.

In some embodiments, a system for controlling steering of a vehicle includes a processor and a memory. The memory includes instructions that, when executed by the processor, cause the processor to: receive, from at least one sensor, information corresponding to an environment external to the vehicle; identify at least one obstacle in the environment external to the vehicle using the information; determine a distance between the vehicle and the at least one obstacle; determine whether a collision between the vehicle and the at least one obstacle is imminent based on the distance between the vehicle and the at least one obstacle and a vehicle speed; in response to a determination that a collision between the vehicle and the at least one obstacle is imminent, determine whether the vehicle can move within a lane of travel to avoid the collision; in response to a determination that the vehicle can move within the lane of travel to avoid the collision, determine a trajectory of travel for the vehicle; generate a steering assist angle command based on the trajectory of travel; and control position of a steering mechanism of the vehicle using the steering assist angle command and a measured steering angle.

In some embodiments, the at least one sensor includes an image-capturing device. In some embodiments, the information includes at least one image captured by the at least one sensor of the environment external to the vehicle. In some embodiments, the at least one sensor includes a radio detection and ranging sensor. In some embodiments, the at least one sensor includes a light detection and ranging sensor. In some embodiments, the at least one sensor includes a sound navigation and ranging sensor. In some embodiments, the at least one sensor includes a global positioning system sensor. In some embodiments, the trajectory of travel of the vehicle includes a transition of the vehicle laterally from a current position to a target position. In some embodiments, the target position includes a position with in the lane of travel of the vehicle furthest from the at least one obstacle. In some embodiments, the instructions further cause the processor to monitor a torque signal corresponding to an amount of torque applied by an operator on a handwheel of the vehicle. The torque signal may be generated by a torque sensor configured to measure torque applied to the handwheel. The instructions may further cause the processor to determine whether the torque signal indicates that the operator is resisting the position control. The instructions may further cause the processor to, in response to a determination that the torque signal indicates that the operator is resisting position control, deactivate controlling the position of the steering mechanism of the vehicle.

In some embodiments, a method for controlling steering of a vehicle includes receiving, from at least one sensor, information corresponding to an environment external to the vehicle and identifying at least one obstacle in the environment external to the vehicle using the information. The method also includes determining a distance between the vehicle and the at least one obstacle and determining whether a collision between the vehicle and the at least one obstacle is imminent based on the distance between the vehicle and the at least one obstacle and a vehicle speed. The method also includes, in response to a determination that a collision between the vehicle and the at least one obstacle is imminent, determining whether the vehicle can move within a lane of travel to avoid the collision. The method also includes, in response to a determination that the vehicle can move within the lane of travel to avoid the collision, determining a trajectory of travel for the vehicle. The method also includes generating a steering assist angle command based on the trajectory of travel and controlling position of a steering mechanism of the vehicle using the steering assist angle command and a measured steering angle.

In some embodiments, the at least one sensor includes an image-capturing device. In some embodiments, the information includes at least one image captured by the at least one sensor of the environment external to the vehicle. In some embodiments, the at least one sensor includes a radio detection and ranging sensor. In some embodiments, the at least one sensor includes a light detection and ranging sensor. In some embodiments, the at least one sensor includes a sound navigation and ranging sensor. In some embodiments, the at least one sensor includes a global positioning system sensor. In some embodiments, the trajectory of travel of the vehicle includes a transition of the vehicle laterally from a current position to a target position. In some embodiments, the target position includes a position with in the lane of travel of the vehicle furthest from the at least one obstacle.

In some embodiments, an apparatus for controlling steering of a vehicle includes a processor and a memory. The memory includes instructions that, when executed by the processor, cause the processor to: determine a distance between the vehicle and at least one obstacle, the at least one obstacle being indicated by an output of at least one sensor; determine whether a collision between the vehicle and the at least one obstacle is imminent based on the distance between the vehicle and the at least one obstacle and a vehicle speed; in response to a determination that a collision between the vehicle and the at least one obstacle is imminent, determine a trajectory of travel for the vehicle that avoids collision with the obstacle while maintaining a lane of travel of the vehicle; generate a steering assist angle command based on the trajectory of travel; and control position of a steering mechanism of the vehicle using the steering assist angle command and a measured steering angle.

In some embodiments, the trajectory of travel of the vehicle further includes a transition of the vehicle laterally from a current position to a target position.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A system for controlling steering of a vehicle, the system comprising:
   a processor; and
   a memory that includes instructions that, when executed by the processor, cause the processor to:
   receive, from at least one sensor, information corresponding to an environment external to the vehicle;
   identify at least one obstacle in the environment external to the vehicle using the information;
   determine a distance between the vehicle and the at least one obstacle;
   determine whether a collision between the vehicle and the at least one obstacle is imminent based on the distance between the vehicle and the at least one obstacle and a vehicle speed;
   in response to a determination that a collision between the vehicle and the at least one obstacle is imminent, determine whether the vehicle can move within a lane of travel to avoid the collision;
   in response to a determination that the vehicle can move within the lane of travel to avoid the collision, determine a trajectory of travel for the vehicle;
   generate a steering assist angle command based on the trajectory of travel;
   generate a torque overlay based on the steering assist angle command and a measured steering angle; and
   selectively control position of a steering assist mechanism of the vehicle based on the torque overlay and an operator applied torque to avoid collision with the obstacle while maintaining the lane of travel of the vehicle.

2. The system of claim 1, wherein the at least one sensor includes an image-capturing device.

3. The system of claim 2, wherein the information includes at least one image captured by the at least one sensor of the environment external to the vehicle.

4. The system of claim 1, wherein the at least one sensor includes a radio detection and ranging sensor.

5. The system of claim 1, wherein the at least one sensor includes a light detection and ranging sensor.

6. The system of claim 1, wherein the at least one sensor includes a sound navigation and ranging sensor.

7. The system of claim 1, wherein the at least one sensor includes a global positioning system sensor.

8. The system of claim 1, wherein the trajectory of travel of the vehicle includes a transition of the vehicle laterally from a current position to a target position.

9. The system of claim 8, wherein the target position includes a position with in the lane of travel of the vehicle furthest from the at least one obstacle.

10. A method for controlling steering of a vehicle, the method comprising:
    receiving, from at least one sensor, information corresponding to an environment external to the vehicle;
    identifying at least one obstacle in the environment external to the vehicle using the information;
    determining a distance between the vehicle and the at least one obstacle;
    determining whether a collision between the vehicle and the at least one obstacle is imminent based on the distance between the vehicle and the at least one obstacle and a vehicle speed;
    in response to a determination that a collision between the vehicle and the at least one obstacle is imminent, determining whether the vehicle can move within a lane of travel to avoid the collision;
    in response to a determination that the vehicle can move within the lane of travel to avoid the collision, determining a trajectory of travel for the vehicle;
    generating a steering assist angle command based on the trajectory of travel;
    generating a torque overlay based on the steering assist angle command and a measured steering angle; and
    selectively controlling position of a steering assist mechanism of the vehicle based on the torque overlay and an operator applied torque to avoid collision with the obstacle while maintaining the lane of travel of the vehicle.

11. The method of claim 10, wherein the at least one sensor includes an image-capturing device.

12. The method of claim 11, wherein the information includes at least one image captured by the at least one sensor of the environment external to the vehicle.

13. The method of claim 10, wherein the at least one sensor includes a radio detection and ranging sensor.

14. The method of claim 10, wherein the at least one sensor includes a light detection and ranging sensor.

15. The method of claim 10, wherein the at least one sensor includes a sound navigation and ranging sensor.

16. The system of claim 1, wherein the at least one sensor includes a global positioning system sensor.

17. The method of claim 10, wherein the trajectory of travel of the vehicle includes a transition of the vehicle laterally from a current position to a target position.

18. The method of claim 17, wherein the target position includes a position with in the lane of travel of the vehicle furthest from the at least one obstacle.

19. An apparatus for controlling steering of a vehicle, the apparatus comprising:
   a processor; and
   a memory that includes instructions that, when executed by the processor, cause the processor to:
      determine a distance between the vehicle and at least one obstacle, the at least one obstacle being indicated by an output of at least one sensor;
      determine whether a collision between the vehicle and the at least one obstacle is imminent based on the distance between the vehicle and the at least one obstacle and a vehicle speed;
      in response to a determination that a collision between the vehicle and the at least one obstacle is imminent, determine a trajectory of travel for the vehicle that avoids collision with the obstacle while maintaining a lane of travel of the vehicle;
      generate a steering assist angle command based on the trajectory of travel;
      generate a torque overlay based on the steering assist angle command and a measured steering angle; and
      selectively control position of a steering assist mechanism of the vehicle based on the torque overlay and an operator applied torque to avoid collision with the obstacle while maintaining the lane of travel of the vehicle.

20. The apparatus of claim 19, wherein the trajectory of travel of the vehicle further includes a transition of the vehicle laterally from a current position to a target position.

* * * * *